United States Patent
Huang et al.

(10) Patent No.: US 11,006,474 B2
(45) Date of Patent: May 11, 2021

(54) METHOD FOR REESTABLISHING CONNECTION USING A RAR IN A WIRELESS COMMUNICATION NETWORK

(71) Applicant: CLOUDMINDS (SHANGHAI) ROBOTICS CO., LTD., Shanghai (CN)

(72) Inventors: William Xiao-Qing Huang, Shenzhen (CN); Zhenkai Wang, Shenzhen (CN); Haitao Jiang, Shenzhen (CN)

(73) Assignee: CLOUDMINDS (SHANGHAI) ROBOTICS CO., LTD., Shanghai (CN)

( * ) Notice: Subject to any disclaimer, the term of this patent is extended or adjusted under 35 U.S.C. 154(b) by 0 days.

(21) Appl. No.: 16/551,722

(22) Filed: Aug. 27, 2019

(65) Prior Publication Data
US 2019/0387566 A1 Dec. 19, 2019

Related U.S. Application Data

(63) Continuation of application No. PCT/CN2017/093050, filed on Jul. 14, 2017.

(51) Int. Cl.
*H04W 4/00* (2018.01)
*H04W 76/19* (2018.01)
(Continued)

(52) U.S. Cl.
CPC ......... *H04W 76/19* (2018.02); *H04W 56/001* (2013.01); *H04W 72/0453* (2013.01); *H04W 74/0833* (2013.01)

(58) Field of Classification Search
CPC ............... H04W 76/19; H04W 56/001; H04W 72/0453; H04W 74/0833
See application file for complete search history.

(56) References Cited

U.S. PATENT DOCUMENTS

| | | | | |
|---|---|---|---|---|
| 2010/0309929 A1* | 12/2010 | Gao | ................. | H04W 56/0005 370/458 |
| 2011/0103328 A1* | 5/2011 | Lee | ..................... | H04W 74/004 370/329 |

(Continued)

FOREIGN PATENT DOCUMENTS

| | | |
|---|---|---|
| CN | 101801103 A | 8/2010 |
| CN | 102036284 A | 4/2011 |

(Continued)

OTHER PUBLICATIONS

Cloudminds (Shenzhen) Robotics System Co., Ltd., First Office Action (CN), CN201780001954.6, dated Jul. 14, 2020, 9 pgs.

*Primary Examiner* — Abdelnabi O Musa
(74) *Attorney, Agent, or Firm* — Morgan, Lewis & Bockius LLP

(57) ABSTRACT

A method, a terminal, and a storage medium is provided. The method includes: sending, on the first uplink carrier, a random access request to a network device when being out of uplink synchronization on a first uplink carrier in a first uplink frequency range, where the first uplink carrier is a carrier that is determined by the network device in the first uplink frequency range in a paired combination of frequency bands; obtaining, when the random access request on the first uplink carrier fails, a first quantity of failures of the random access request; and determining a first target uplink frequency range in a second uplink frequency range in the paired combination of the frequency bands when the first quantity of failures reaches a preset threshold value, and sending, on a second uplink carrier in the first target uplink frequency range, the random access request to the network device.

20 Claims, 4 Drawing Sheets

(51) Int. Cl.
    *H04W 56/00*     (2009.01)
    *H04W 72/04*     (2009.01)
    *H04W 74/08*     (2009.01)

(56) References Cited

U.S. PATENT DOCUMENTS

| | | | |
|---|---|---|---|
| 2012/0213058 A1* | 8/2012 | Duan | H04W 72/0453 370/221 |
| 2013/0182688 A1* | 7/2013 | Damnjanovic | H04L 5/001 370/336 |
| 2014/0064195 A1* | 3/2014 | Li | H04W 56/00 370/329 |
| 2014/0241285 A1* | 8/2014 | Pang | H04W 74/0833 370/329 |
| 2020/0145089 A1* | 5/2020 | Wei | H04W 72/0453 |
| 2020/0187258 A1* | 6/2020 | Lee | H04W 74/0833 |

FOREIGN PATENT DOCUMENTS

| | | |
|---|---|---|
| CN | 102056297 A | 5/2011 |
| CN | 103392373 A | 11/2013 |
| KR | 2011/0071445 A | 6/2011 |
| WO | 2010/124228 A2 | 10/2010 |
| WO | 2011/124018 A1 | 10/2011 |

\* cited by examiner

METHOD FOR REESTABLISHING CONNECTION USING A RAR IN A WIRELESS COMMUNICATION NETWORK

CROSS REFERENCE TO RELATED APPLICATIONS

The present disclosure is a continuation of international application No. PCT/CN2017/093050, filed on Jul. 14, 2017, and titled "CONNECTION RECONSTRUCTION METHOD AND DEVICE, TERMINAL AND STORAGE MEDIUM", which is incorporated herein by reference in its entirety.

TECHNICAL FIELD

The present disclosure relates to information management technologies, and in particular, to a method and an apparatus for reestablishing a connection, a terminal, and a storage medium.

BACKGROUND

In 3G and 4G networks, an uplink coverage capability of a system is poorer than a downlink coverage capability thereof, thereby affecting uplink data transmission. In a 5G network, a gap between the two coverage capabilities is more obvious. Therefore, there is a need to consider that a high frequency band and a low frequency band are combined to be used. That is, when an uplink coverage of the high frequency band is limited, an uplink data is transmitted on an uplink frequency in the low frequency band. The high frequency band may include frequencies such as 28 GHz and 3.5 GHz, and is used to provide a capacity. The low frequency band may include a frequency such as 900 MHz, and is used to provide coverage.

During actual application, 3300 MHz to 3800 MHz and 880 MHz to 915 MHz may be paired for use. For example, downlink data is carried in a frequency range of 3300 MHz to 3800 MHz, and uplink data is carried in the frequency range of 3300 MHz to 3800 MHz and/or a frequency range of 880 MHz to 915 MHz. However, if a terminal operates in the frequency band of 3300 MHz to 3800 MHz and moves to a coverage edge of the frequency band and a base station (BS) does not assign an uplink frequency resource having a wider coverage range (for example, 880 MHz to 915 MHz) to the terminal in time, the terminal is out of uplink synchronization, resulting in a link failure, and causing a call drop. In this case, the terminal is to initiate a reestablishment request on an uplink carrier on which the out-of-synchronization occurs. After the terminal is out of uplink synchronization in a frequency range of 3300 MHz to 3800 MHz, the terminal usually has left an uplink coverage area of the frequency band of 3300 MHz to 3800 MHz. If the terminal continues to initiate the reestablishment request in the uplink frequency range, the terminal may fail to operate, and the terminal needs to continuously apply for a connection reestablishment, which, on one hand, causes power consumption of the terminal, and on the other hand, interrupts a service of the terminal.

SUMMARY

To resolve the problem above, the present disclosure provides a method and an apparatus for reestablishing a connection, a terminal, and a storage medium.

To achieve the objective above, a first aspect of embodiments of the present disclosure provides a method for reestablishing a connection. The method includes: sending by a terminal, on a first uplink carrier, a random access request to a network device when the terminal is out of uplink synchronization on the first uplink carrier in a first uplink frequency range supported by the terminal, where the first uplink carrier is a carrier that is determined by the network device in the first uplink frequency range in a paired combination of frequency bands supported by both the terminal and the network device, and the paired combination of the frequency bands consists of a first frequency band that includes the first uplink frequency range and a first downlink frequency range and a supplementary uplink frequency band that includes at least one second uplink frequency range; obtaining, when the random access request on the first uplink carrier fails, a first quantity of failures of the random access request; and determining a first target uplink frequency range in the second uplink frequency range in paired combination of the frequency bands when the first quantity of failures reaches a preset threshold value, and sending, on a second uplink carrier in the first target uplink frequency range, the random access request to the network device.

A second aspect of the embodiments of the present disclosure provides an apparatus for reestablishing a connection. The apparatus includes: a first sending module which is configured to send, on a first uplink carrier, a random access request to a network device when a terminal is out of uplink synchronization on a first uplink carrier in a first uplink frequency range supported by the terminal, where the first uplink carrier is a carrier that is determined by the network device in the first uplink frequency range in a paired combination of frequency bands supported by both the terminal and the network device, and the paired combination of the frequency bands consists of a first frequency band that includes the first uplink frequency range and a first downlink frequency range and a supplementary uplink frequency band that includes at least one second uplink frequency range; an obtaining module which is configured to obtain, when the random access request on the first uplink carrier fails, a first quantity of failures of the random access request; a determining module which is configured to determine a first target uplink frequency range in the second uplink frequency range in the paired combination of the frequency bands when the first quantity of failures reaches a preset threshold value; and a second sending module which is configured to send, on a second uplink carrier in the first target uplink frequency range, the random access request to the network device.

A third aspect of the embodiments of the present disclosure provides a non-transitory computer-readable storage medium. The non-transitory computer-readable storage medium includes one or more programs. The one or more programs are configured to perform the method according to the first aspect.

A fourth aspect of the embodiments of the present disclosure provides a terminal. The terminal includes: the non-transitory computer-readable storage medium according to the third aspect; and one or more processors which is configured to execute the programs in the non-transitory computer-readable storage medium.

In the technical solution above, when a terminal is out of uplink synchronization on a first uplink carrier in a first uplink frequency range supported by the terminal, the terminal sends, on the first uplink carrier, a random access request to a network device. Herein, the first uplink carrier is a carrier that is determined by the network device in a first uplink frequency range in the paired combination of frequency bands supported by both the terminal and the network device, and the paired combination of the frequency bands consists of a first frequency band that includes the first uplink frequency range and a first downlink frequency range and a supplementary uplink frequency band that includes at least one second uplink frequency range. When the random access request on the first uplink carrier fails, a first quantity of failures of the random access request is obtained. A first target uplink frequency range is determined in the second uplink frequency range in the paired combination of the frequency bands when the first quantity of failures reaches a preset threshold value, and the random access request is sent, on a second uplink carrier in the first target uplink frequency range, to the network device. In this way, the terminal can reestablish a connection by switching to a different carrier according to a quantity of failures of the random access request, preventing the terminal from continuously sending the random access request to reestablish a connection when uplink out-of-synchronization occurs on a current carrier, thereby quickly restoring the connection, and increasing a success rate of connection reestablishment.

DETAILED DESCRIPTION

Specific embodiments of the present disclosure are described in detail with reference to accompanying drawings. It should be understood that the specific embodiments described herein are merely used for describing and explaining the present disclosure rather than limiting the present disclosure.

The technical solutions provided in the following embodiments of the present disclosure may be applied to a 5G mobile communication system. The system may include a network device and a terminal. The network device may be a BS. The BS is a device communicating with the terminal. The BS may provide communication coverage in a specific physical area. For example, the BS may be specifically an evolutional Node B (eNB or eNodeB) in LTE, or may be another access network device providing an access service in a wireless communication network.

Terminals may be distributed in the entire mobile communications system. Each terminal may be fixed or mobile. For example, the terminal may be a mobile station, a subscriber unit, or a station, or may be a cellular phone, a personal digital assistant (PDA for short), a handheld device, a laptop computer, or another wireless communication device.

Figure 1:
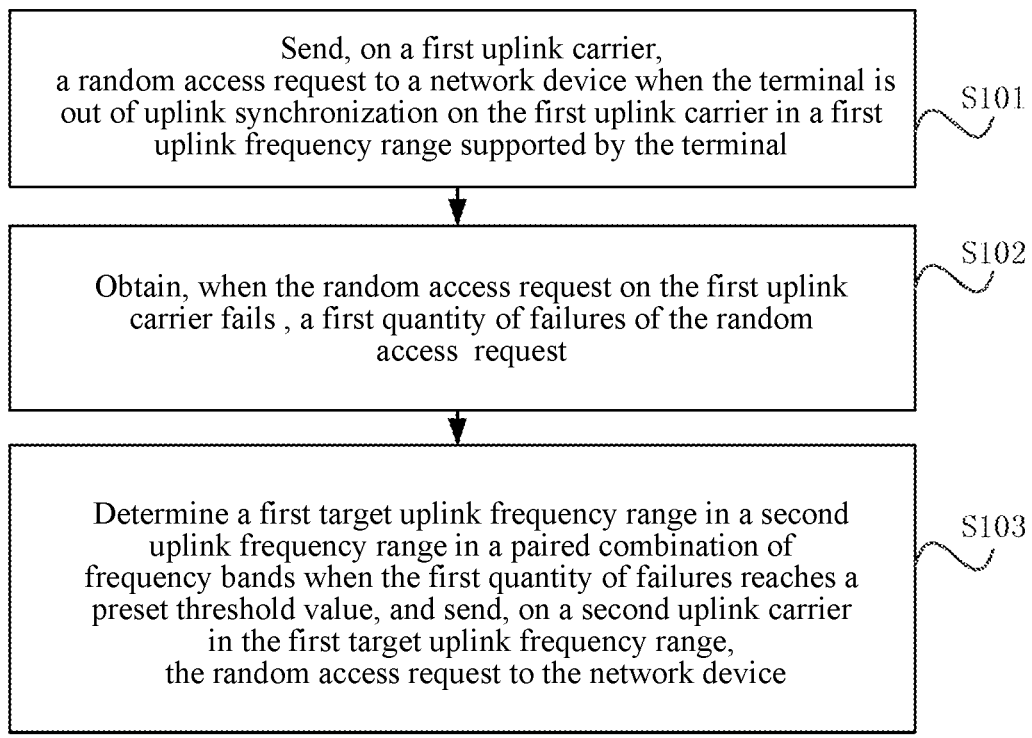
FIG. 1 is a schematic flowchart of a method for reestablishing a connection according to an embodiment of the present disclosure.

FIG. 1 shows a method for reestablishing a connection according to an embodiment of the present disclosure. As shown in FIG. 1, the method is applied to a terminal. The method includes the following steps.

At step S101, the terminal sends, on a first uplink carrier, a random access request to a network device when the terminal is out of uplink synchronization on the first uplink carrier in a first uplink frequency range supported by the terminal.

Herein, the first uplink carrier is a carrier that is determined by the network device in a first uplink frequency range in a paired combination of frequency bands supported by both the terminal and the network device. The paired combination of the frequency bands consists of a first frequency band that includes the first uplink frequency range and a first downlink frequency range and a supplementary uplink frequency band that includes at least one second uplink frequency range. For example, the combination of the frequency bands may include: a frequency band, namely, Band X, which includes an uplink operating frequency range of 3300 MHz to 3800 MHz and a downlink operating frequency range of 3300 MHz to 3800 MHz and a supplementary uplink frequency band, namely, Band Y, which includes an uplink frequency range of 880 MHz to 915 MHz. Uplink data corresponding to the combination of the frequency bands may be sent on carriers in two uplink frequency ranges such as 3300 MHz to 3800 MHz and 880 MHz to 915 MHz, and downlink data may be sent in a downlink frequency range such as 3300 MHz to 3800 MHz. Generally, when the terminal is in a cell center, the uplink data may be carried in the frequency range of 3300 MHz to 3800 MHz, and when the terminal is at an edge of a cell, the uplink data may be carried in the frequency range of 880 MHz to 915 MHz.

In addition, in this step, that the terminal is out of uplink synchronization on the first uplink carrier in the first uplink frequency range supported by the terminal may be determined in the following manner: after the terminal successfully sends, on the first uplink carrier, the random access request to the network device, the network device sends a random access request response to the terminal. Herein, the random access request response includes a timing advance, and the network device subsequently periodically sends the timing advance to the terminal. When the terminal does not receive the timing advance in a first preset time period, the terminal is determined to have been out of uplink synchronization, and no uplink data is allowed to be sent any more. In this case, the terminal initiates a random access request on the first uplink carrier again, to attempt to reestablish a connection.

In a possible implementation, a timer which is used for timing and which corresponds to the first uplink carrier may be set by the terminal. When the terminal receives the timing advance which corresponds to the first uplink carrier and which is from the network device, the timer is reset to zero. When the terminal received the timing advance last time, the timer is restarted after the timer is reset to zero, and when a time period recorded on the timer reaches the first preset time period and the terminal does not receive the timing advance corresponding to the first uplink carrier, the terminal is determined to have been out of uplink synchronization.

It should be noted that the first preset time period may be configured by the network device or a network management system according to a quantity of terminals in a connected mode on the first uplink carrier, and is notified to the terminal by the network device or the network management system. When more terminals in the connected mode on the first uplink carrier correspond to the network device, the first preset time period may be set shorter, to ensure reliability because of consistent arrival times of uplink data of all terminals on the first uplink carrier corresponding to the network device, and reduce an interference risk. When there are fewer terminals, the first preset time period may be set longer, that is, a difference between time points at which uplink data of all terminals arrives at a BS may be larger, which increases an interference risk to some extent, but prevents more terminals from reestablishing a connection, thereby reducing an overhead of uplink synchronization.

At step S102, the terminal obtain, when the random access request on the first uplink carrier fails, a first quantity of failures of the random access request.

In this step, after the random access request on the first uplink carrier is sent to the network device, whether feedback information sent by the network device is received in a second preset time period may be determined. When the feedback information sent by the network device is received, the random access request on the first uplink carrier is determined to be successful. When the feedback information sent by the network device is not received, the random access request on the first uplink carrier is determined to fail.

After the random access request on the first uplink carrier is determined to fail, the first quantity of failures may be obtained via a first counter corresponding to the first uplink carrier. When the random access request on the first uplink carrier fails, a count value of the first counter is added by one. When the random access request on the first uplink carrier is successful, the count value of the first counter is cleared. In this step, when the random access request is determined to fail, a count value of the first counter may be added by one, and the count value of the first counter is read, so that the first quantity of failures can be obtained.

At step S103, the terminal determines a first target uplink frequency range in a second uplink frequency range in a paired combination of frequency bands when the first quantity of failures reaches a preset threshold value, and sends, on a second uplink carrier in the first target uplink frequency range, the random access request to the network device.

In this step, a third uplink frequency range may be determined in the second uplink frequency range in the paired combination of the frequency bands. Herein, the third uplink frequency range is a frequency range in the second uplink frequency range in which a carrier is less than the first uplink carrier. After the third uplink frequency range is determined, the first target uplink frequency range may be determined in either of the following two processing manners. One processing manner is that an uplink frequency range that corresponds to a carrier having a smallest load in the third uplink frequency range is determined, and the uplink frequency range that corresponds to the carrier having the smallest load is determined as the first target uplink frequency range. The other processing manner is that an uplink frequency range corresponding to a carrier in the third uplink frequency range is randomly determined as the first target uplink frequency range.

It should be noted that the preset threshold value is configured and notified to the terminal by the network device or the network management system. That the preset threshold value is set smaller indicates the terminal can more quickly initiate uplink synchronization reestablishment and send uplink data on the second uplink carrier having better coverage. That the preset threshold value is set larger indicates the terminal can make more attempts on the original first uplink carrier, to reduce a load pressure for initiating the uplink synchronization reestablishment on the second uplink carrier having the better coverage.

Herein, the terminal sends the random access request to the network device on the second uplink carrier in the first target uplink frequency range, and determines whether the random access request on the second uplink carrier is successful. When the random access request on the second uplink carrier fails, a second quantity of failures of the random access request is obtained. When the second quantity of failures reaches the preset threshold value, whether a new uplink frequency range exists in the second uplink frequency range in the paired combination of the frequency bands is determined. When the new uplink frequency range is determined to exist, a second target uplink frequency range in the new uplink frequency range is determined, and the random access request is sent, on an uplink carrier in the second target uplink frequency range, to the network device. That a wireless link connection fails is determined when a new uplink frequency range is determined not to exist.

Uplink data is sent on the second uplink carrier when the random access request on the second uplink carrier is successful.

If the second uplink frequency range in the combination of the frequency bands further includes a fourth uplink frequency range, the terminal has not sent a random access request on a carrier in the fourth uplink frequency range, and a carrier in the fourth uplink frequency range is less than that in an uplink frequency range in which the random access request has been sent, the fourth uplink frequency range is determined as the new uplink frequency range.

In this way, the terminal can reestablish a connection by switching to a different carrier according to a quantity of failures of the random access request, preventing the terminal from continuously sending the random access request to reestablish a connection when uplink out-of-synchronization occurs on a current carrier, thereby quickly restoring the connection, and increasing a success rate of connection reestablishment.

Figure 2:
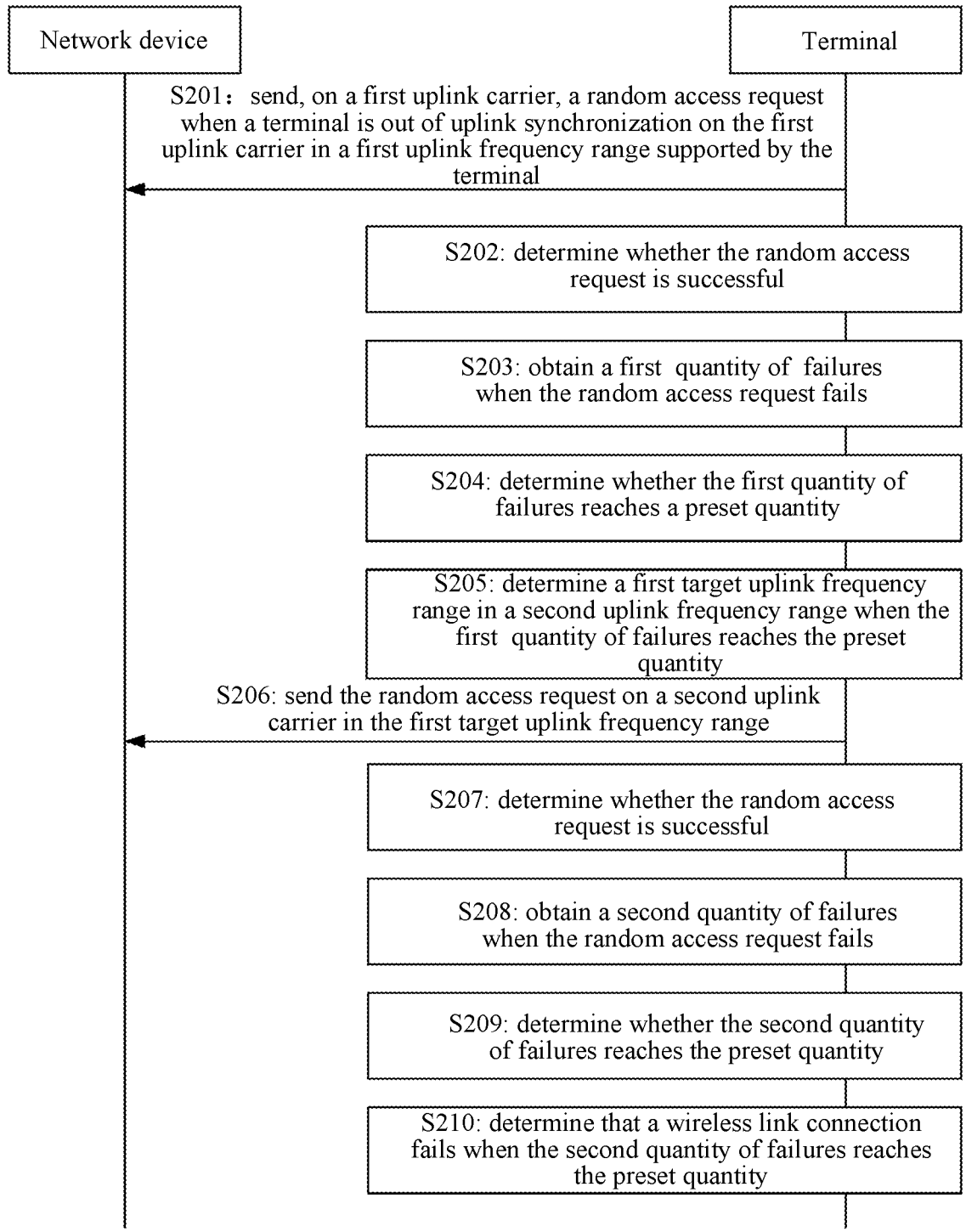
FIG. 2 is another schematic flowchart of a method for reestablishing a connection according to an embodiment of the present disclosure.

FIG. 2 shows a method for reestablishing a connection according to an embodiment of the present disclosure and exemplifies that a paired combination of frequency bands in this embodiment consists of a first frequency band that includes a first uplink frequency range and a first downlink frequency range and a supplementary uplink frequency band that includes one second uplink frequency range. The method includes the following steps.

At step S201, a terminal determines to send, on a first uplink carrier, a random access request to a network device when the terminal is out of uplink synchronization on the first uplink carrier in a first uplink frequency range supported by the terminal.

The first uplink carrier is a carrier that is determined by the network device in the first uplink frequency range in the paired combination of the frequency bands supported by both the terminal and the network device. The paired combination of the frequency bands consists of a first frequency band that includes the first uplink frequency range and a first downlink frequency range and a supplementary uplink frequency band that includes at least one second uplink frequency range. For example, the frequency band combination may include: a frequency band, namely, Band X, which includes an uplink operating frequency range of 3300 MHz to 3800 MHz and a downlink operating frequency range of 3300 MHz to 3800 MHz and a supplementary uplink frequency band, namely, Band Y, which includes an uplink frequency range of 880 MHz to 915 MHz. Uplink data corresponding to the combination of the frequency bands may be sent on carriers in two uplink frequency ranges such as 3300 MHz to 3800 MHz and 880 MHz to 915 MHz, and downlink data may be sent in a downlink frequency range such as 3300 MHz to 3800 MHz. Generally, when the terminal is in a cell center, the uplink data may be carried in the frequency range of 3300 MHz to 3800 MHz, and when the terminal is at an edge of a cell, the uplink data may be carried in the frequency range of 880 MHz to 915 MHz.

In this step, that the terminal is out of uplink synchronization on the first uplink carrier in the first uplink frequency range supported by the terminal may be determined in the following manner: after the terminal successfully sends the random access request to the network device on the first uplink carrier, the network device sends a random access request response to the terminal. Herein, the random access request response includes a timing advance, and the network device subsequently periodically sends the timing advance to the terminal. When the terminal does not receive the timing advance within a first preset time period, the terminal is determined to have been out of uplink synchronization, and no uplink data is allowed to be sent any more. In this case, the terminal initiates a random access request on the first uplink carrier again, to attempt to reestablish a connection.

In a possible implementation, a timer which is used for timing and which corresponds to the first uplink carrier may be set by the terminal. When the terminal receives the timing advance which corresponds to the first uplink carrier and which is from the network device, the timer is reset to zero. When the terminal received the timing advance last time, the timer is restarted after the timer is reset to zero, and when a time period recorded on the timer reaches the first preset time period and the terminal does not receive the timing advance corresponding to the first uplink carrier, the terminal is determined to have been out of uplink synchronization.

It should be noted that the first preset time period may be configured by the network device or a network management system according to a quantity of terminals in a connected mode on the first uplink carrier, and is notified to the terminal by the network device or the network management system. When more terminals in the connected mode on the first uplink carrier correspond to the network device, the first preset time period may be set shorter, to ensure reliability because of consistent arrival times of uplink data of all terminals on the first uplink carrier corresponding to the network device, and reduce interference risk. When there are fewer terminals, the first preset time period may be set longer, that is, a difference between time points at which uplink data of all terminals arrives at a BS may be larger, which increases an interference risk to some extent, but prevents more terminals from reestablishing a connection, thereby reducing an overhead of uplink synchronization.

At step S202, the terminal determines whether the random access request on the first uplink carrier is successful.

In this step, after the random access request on the first uplink carrier is sent to the network device, whether feedback information sent by the network device is received in a second preset time period may be determined. When the feedback information sent by the network device is received, the random access request on the first uplink carrier is determined to be successful. When the feedback information sent by the network device is not received, the random access request on the first uplink carrier is determined to fail.

After the random access request on the first uplink carrier is determined to fail, a first quantity of failures may be obtained via a first counter corresponding to the first uplink carrier. When the random access request on the first uplink carrier fails, a count value of the first counter is added by one. When the random access request on the first uplink carrier is successful, the count value of the first counter is cleared. In this step, when the random access request is determined to fail, a count value of the first counter may be added by one, and the count value of the first counter is read, so that the first quantity of failures can be obtained.

Uplink data is sent on the first uplink carrier when the random access request is determined to be successful.

Step S203 and step S204 are performed when the random access request is determined to fail.

At step S203, the terminal obtains a first quantity of failures of the random access request.

The first quantity of failures may be obtained via the first counter corresponding to the first uplink carrier. When the random access request on the first uplink carrier fails, a count value of the first counter is added by one. When the random access request on the first uplink carrier is successful, the count value of the first counter is cleared. In this step, when the random access request is determined to fail, a count value of the first counter may be added by one, and the count value of the first counter is read, so that the first quantity of failures can be obtained At step S204, the terminal determines whether the first quantity of failures reaches a preset threshold value.

When the first quantity of failures is determined not to reach the preset threshold value, the random access request on the first uplink carrier is continued to be sent to the network device.

When the first quantity of failures is determined to reach the preset threshold, step S205 is performed.

It should be noted that the preset threshold value is configured and notified to the terminal by the network device or the network management system. That the preset threshold value is set smaller indicates the terminal can more quickly initiate uplink synchronization reestablishment and send uplink data on a second uplink carrier having better coverage. That the preset threshold is set larger indicates that the terminal can make more attempts on the original first uplink carrier, to reduce a load pressure for initiating the uplink synchronization reestablishment on the second uplink carrier having the better coverage.

At step S205, the terminal determines a first target uplink frequency range in a second uplink frequency range in the paired combination of the frequency bands.

In this step, a third uplink frequency range may be determined in the second uplink frequency range in the paired combination of the frequency bands. Herein, the third uplink frequency range is a frequency range in the second uplink frequency range in which a carrier is less than the first uplink carrier. After the third uplink frequency range is determined, the first target uplink frequency range may be determined in either of the following processing manners. One processing manner is that an uplink frequency range that corresponds to a carrier having a smallest load in the third uplink frequency range is determined, and the uplink frequency range that corresponds to the carrier having the smallest load is determined as the first target uplink frequency range. The other processing manner is that an uplink frequency range corresponding to a carrier in the third uplink frequency range is randomly determined as the first target uplink frequency range.

In this embodiment, there is only one second uplink frequency range. Therefore, the second uplink frequency range may be determined as the first target uplink frequency range.

At step S206, the terminal sends, on a second uplink carrier in the first target uplink frequency range, the random access request to the network device.

At step S207, the terminal determines whether the random access request on the second uplink carrier is successful.

When the random access request on the second uplink carrier is determined to be successful, the uplink data is sent on the second uplink carrier.

When the random access request on the second uplink carrier is determined to fail, step S210 is performed.

At step S208, the terminal obtains a second quantity of failures of the random access request.

The second quantity of failures may be obtained via a second counter corresponding to the second uplink carrier. When the random access request on the second uplink carrier fails, a count value of the second counter is added by one. When the random access request on the second uplink carrier is successful, the count value of the second counter is cleared. In this step, when the random access request is determined to fail, the count value of the second counter may be added by one, and the count value of the second counter is read, so that the second quantity of failures can be obtained.

At step S209, the terminal determines whether the second quantity of failures reaches the preset threshold value.

When the second quantity of failures is determined not to reach the preset threshold, the random access request on the second uplink carrier is continued to be sent to the network device.

When the second quantity of failures is determined to reach the preset threshold value, step S210 is performed.

At step S210, the terminal determines that a wireless link connection fails.

In this embodiment, no new uplink frequency range exists in the second uplink frequency range in the combination of the frequency bands. Therefore, when the second quantity of failures is determined to reach the preset threshold, the wireless link connection is determined to fail, and a cell search is re-initiated.

It should be noted that this embodiment exemplifies that the combination of the frequency bands includes one first uplink frequency range and one second uplink frequency range. This embodiment is not limited thereto. The second uplink frequency range in the combination of the frequency bands may alternatively include more uplink frequency ranges (for example, include three or more uplink frequency ranges). In this case, in step S209, after determining that the second quantity of failures reaches the preset threshold, the terminal may perform the following steps.

At step S1, the terminal determines whether a new uplink frequency range exists in the combination of the frequency bands.

If the second uplink frequency range in the combination of the frequency bands further includes a fourth uplink frequency range, the terminal has not sent, on a carrier in the fourth uplink frequency range, the random access request, and a carrier in the fourth uplink frequency range is less than that in an uplink frequency range in which the random access request has been sent, the fourth uplink frequency range is determined as the new uplink frequency range.

At step S2, a target uplink frequency range in the new uplink frequency range is determined when the new uplink frequency range is determined to exist, the random access request is sent, on an uplink carrier in the target uplink frequency range, to the network device, and a wireless link connection is determined to fail when the new uplink frequency range is determined not to exist.

Herein, if the random access request on a target uplink carrier is successful, the uplink data is sent on the target uplink carrier. If the random access request on the target uplink carrier fails, steps S1 and S2 are alternately cyclically performed.

By the method above, the terminal can reestablish a connection by switching to a different carrier according to a quantity of failures of the random access request, preventing the terminal from continuously sending the random access request on a current carrier to reestablish a connection when uplink out-of-synchronization occurs on the current carrier, thereby quickly restoring the connection, and increasing a success rate of connection reestablishment.

Figure 3:
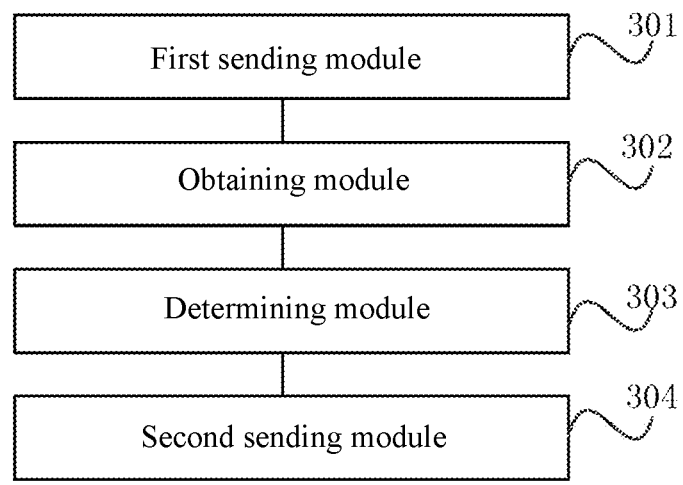
FIG. 3 is a schematic structural diagram of an apparatus for reestablishing a connection according to an embodiment of the present disclosure.

FIG. 3 shows an apparatus for reestablish a connection according to an embodiment of the present disclosure. As shown in FIG. 3, the apparatus is applied to a terminal. The terminal includes a first sending module 301, an obtaining module 302, a determining module 303 and a second sending module 304.

The first sending module 301 is configured to send, on the first uplink carrier, a random access request to a network device when the terminal is out of uplink synchronization on a first uplink carrier in a first uplink frequency range supported by the terminal. Herein, the first uplink carrier is a carrier that is determined by the network device in the first uplink frequency range in a paired combination of frequency bands supported by both the terminal and the network device. The paired combination of the frequency bands consists of a first frequency band that includes the first uplink frequency range and a first downlink frequency range and a supplementary uplink frequency band that includes at least one second uplink frequency range.

The obtaining module 302 is configured to obtain, when the random access request on the first uplink carrier fails, a first quantity of failures of the random access request.

The determining module 303 is configured to determine a first target uplink frequency range in the second uplink frequency range in the paired combination of the frequency bands when the first quantity of failures reaches a preset threshold value.

The second sending module 304 is configured to send, on a second uplink carrier in the first target uplink frequency range, the random access request to the network device.

Optionally, the obtaining module 302 is configured to add a count value of a first counter corresponding to the first uplink carrier by one and obtain the count value of the first counter to obtain the first quantity of failures. Herein, the count value of the first counter is added by one when the random access request on the first uplink carrier fails, and is cleared when the random access request is successfully sent.

Figure 4:
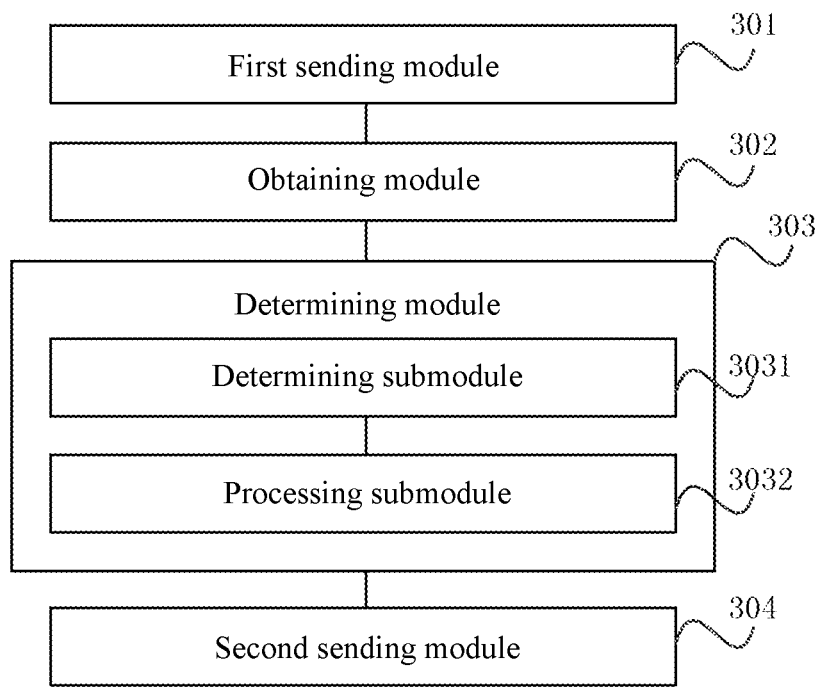
FIG. 4 is another schematic structural diagram of an apparatus for reestablishing a connection according to an embodiment of the present disclosure.

Optionally, as shown in FIG. 4, the determining module 303 includes a determining submodule 3031 and a processing submodule 3032.

The determining submodule 3031 is configured to determine a third uplink frequency range in the second uplink frequency range in the paired combination of the frequency bands. Herein, the third uplink frequency range is a frequency range in the second uplink frequency range in which a carrier is less than the first uplink carrier.

The processing submodule 3032 is configured to determine an uplink frequency range that corresponds to a carrier having a smallest load in the third uplink frequency range, and determine the uplink frequency range that corresponds to the carrier having the smallest load as the first target uplink frequency range; or, the processing submodule 3032 is configured to randomly determine an uplink frequency range corresponding to a carrier in the third uplink frequency range as the first target uplink frequency range.

Figure 5:
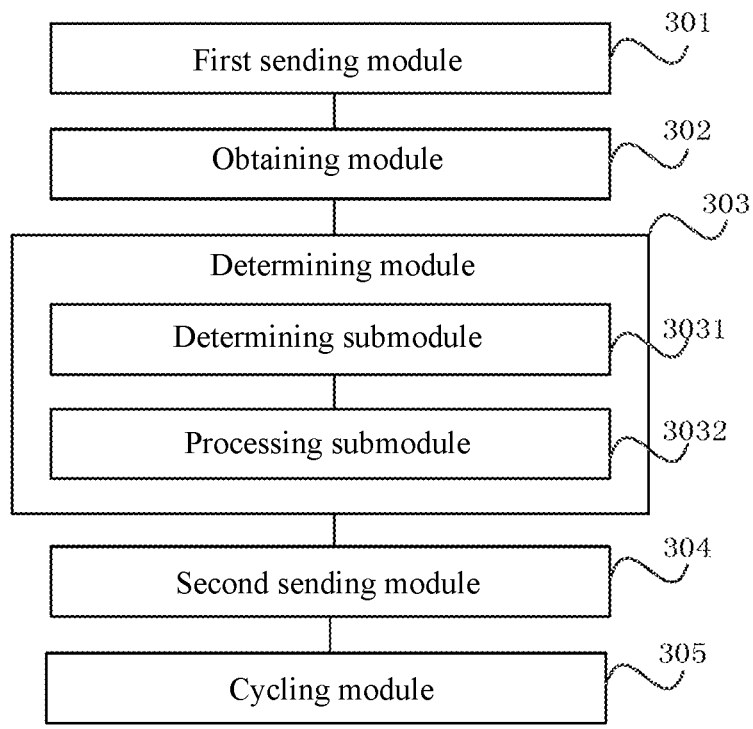
FIG. 5 is still another schematic structural diagram of an apparatus for reestablishing a connection according to an embodiment of the present disclosure.

Optionally, as shown in FIG. 5, the apparatus further includes a cycling module 305.

The cycling module 305 is configured to continue to determine whether the random access request on the second uplink carrier is successful, obtain a second quantity of failures of the random access request when the random access request on the second uplink carrier fails, determine whether a new uplink frequency range exists in the second uplink frequency range in the paired combination of the frequency bands when the second quantity of failures reaches the preset threshold value, determine a second target uplink frequency range in the new uplink frequency range when the new uplink frequency range is determined to exist, and send, on an uplink carrier in the second target uplink frequency range, the random access request to the network device.

Optionally, the cycling module 305 is further configured to determine that a wireless link connection fails when the new uplink frequency range is determined not to exist.

Optionally, the cycling module 305 is further configured to send, on the second uplink carrier, uplink data when the random access on the second uplink carrier request is successful.

By the apparatus above, the terminal can reestablish a connection by switching to a different carrier according to a quantity of failures of the random access request, preventing the terminal from continuously sending, on a current carrier, the random access request to reestablish a connection when uplink out-of-synchronization occurs on the current carrier, thereby quickly restoring the connection, and increasing a success rate of connection reestablishment.

Figure 6:
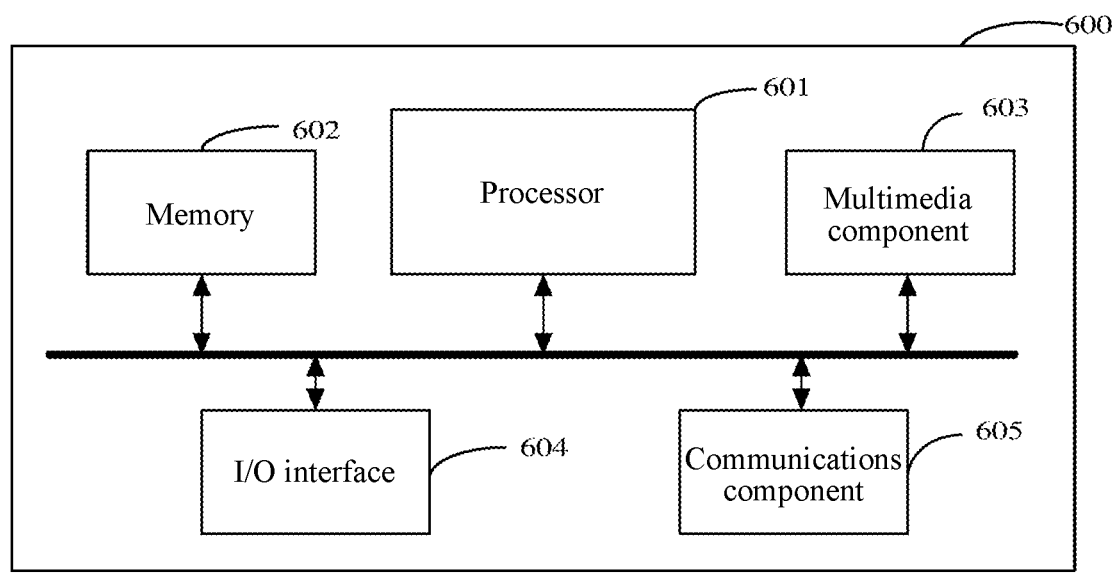
FIG. 6 is a schematic diagram of a hardware structure of an apparatus for reestablishing a connection according to an embodiment of the present disclosure.

FIG. 6 is a schematic structural diagram of an apparatus 600 for reestablishing a connection according to an embodiment of the present disclosure. The apparatus 600 may be provided as a terminal. As shown in FIG. 6, the apparatus 600 may include a processor 601, a memory 602, a multimedia component 603, an input/output (I/O) interface 604, and a communication component 605.

The processor 601 is configured to control overall operation of the apparatus 600 to complete all or some steps in the method for reestablishing a connection above. The memory 602 is configured to store various types of data to support the operations of the apparatus 600. The data may include, for example, an instruction configured to perform any application program or method operated on the apparatus 600.

The memory 602 may be implemented by any type of volatile or non-volatile storage device or a combination thereof, for example, a static random access memory (SRAM for short), an electrically erasable programmable read-only memory (EEPROM for short), an erasable programmable read only memory (EPROM for short), a programmable read-only memory (PROM for short), a read-only memory (ROM for short), a magnetic memory, a flash memory, a magnetic disk, or an optical disc.

The multimedia component 603 may include a screen and an audio component. The screen may be, for example, a touch screen, and the audio component is configured to output and/or input an audio signal.

The communications component 605 is configured to perform wired or wireless communication between the apparatus 600 and another device. The wireless communication is, for example, Wi-Fi, Bluetooth, near field communication (NFC for short), 2G, 3G, 4G, or a combination thereof. Therefore, the respective communication component 605 may include a Wi-Fi module, a Bluetooth module, and an NFC module.

In an example of an embodiment, the apparatus 600 may be implemented by one or more application-specific integrated circuits (ASIC for short), a digital signal processor (DSP for short), a digital signal processing device (DSPD for short), a programmable logic device (PLD for short), a field programmable gate array (FPGA for short), a controller, an microcontroller, an microprocessor or other electronic components, which is configured to perform the method for reestablishing a connection above.

An embodiment of the present disclosure further provides a non-transitory computer-readable storage medium 1. The non-transitory computer-readable storage medium 1 includes one or more programs. The one or more programs are configured to execute a method for reestablishing a connection. The method is applied to a terminal. The method includes: sending by a terminal, on a first uplink carrier, a random access request to a network device when the terminal is out of uplink synchronization on the first uplink carrier in a first uplink frequency range supported by the terminal, where the first uplink carrier is a carrier that is determined by the network device in the first uplink frequency range in a paired combination of frequency bands supported by both the terminal and the network device, and the paired combination of the frequency bands consists of a first frequency band that includes the first uplink frequency range and a first downlink frequency range and a supplementary uplink frequency band that includes at least one second uplink frequency range; obtaining, when the random access request on the first uplink carrier fails, a first quantity of failures of the random access request; and determining a first target uplink frequency range in the second uplink frequency range in the paired combination of the frequency bands when the first quantity of failures reaches a preset threshold value, and sending, on a second uplink carrier in the first target uplink frequency range, the random access request to the network device.

Optionally, the obtaining a first quantity of failures of the random access request includes: adding a count value of a first counter corresponding to the first uplink carrier by one, and obtaining the count value of the first counter to obtain the first quantity of failures. Herein, the count value of the first counter is added by one when the random access request on the first uplink carrier fails, and is cleared when the random access request is successfully sent.

Optionally, the determining a first target uplink frequency range in the second uplink frequency range in the paired combination of the frequency bands includes: determining a third uplink frequency range in the second uplink frequency range in the paired combination of the frequency bands, where the third uplink frequency range is a frequency range in the second uplink frequency range in which a carrier is less than the first uplink carrier; and determining an uplink frequency range that corresponds to a carrier having a smallest load in the third uplink frequency range and determining the uplink frequency range that corresponds to the carrier having the smallest load as the first target uplink frequency range, or, randomly determining an uplink frequency range corresponding to a carrier in the third uplink frequency range as the first target uplink frequency range.

Optionally, after the random access request is sent, on the second uplink carrier supported by the terminal, to the network device, the method further includes: continuing to determine whether the random access request on the second uplink carrier is successful; obtaining, when the random access request on the second uplink carrier fails, a second quantity of failures of the random access request; determining, when the second quantity of failures reaches the preset threshold value, whether a new uplink frequency range exists in the second uplink frequency range in the paired combination of the frequency bands; and determining a second target uplink frequency range in the new uplink frequency range when the new uplink frequency range is determined to exist, and sending, on an uplink carrier in the second target uplink frequency range, the random access request to the network device.

Optionally, the method further includes: determining that a wireless link connection fails when the new uplink frequency range is determined not to exist.

Optionally, the method further includes: sending uplink data on the second uplink carrier when the random access request on the second uplink carrier is successful.

Although preferable embodiments of the present disclosure have been described in detail above with reference to accompanying drawings, the present disclosure is not limited to specific details in the embodiments above. Various simple variations can be made to the technical solutions of the present disclosure within the scope of the technical idea of the present disclosure, and such simple variations all fall within the protection scope of the present disclosure.

It should be further noted that the specific technical features described in the specific embodiments can be combined in any appropriate manner as long as no conflict occurs. To avoid unnecessary repetitions, various possible combination manners will not be described in the present disclosure.

In addition, various different embodiments of the present disclosure may also be combined arbitrarily. Such combinations shall also be considered as the content disclosed by the present disclosure as long as these combinations do not depart from the concept of the present disclosure.

What is claimed is:

1. A method for reestablishing a connection, applied to a terminal, comprising:
   sending by the terminal, on a first uplink carrier, a random access request to a network device when the terminal is out of uplink synchronization on the first uplink carrier in a first uplink frequency range supported by the terminal, wherein the first uplink carrier is a carrier that is determined by the network device in the first uplink frequency range in a paired combination of frequency bands supported by both the terminal and the network device, and the paired combination of the frequency bands consists of a first frequency band that comprises the first uplink frequency range and a first downlink frequency range and a supplementary uplink frequency band that comprises at least one second uplink frequency range, the first uplink frequency range being different from the at least one second uplink frequency range;
   obtaining, when the random access request on the first uplink carrier fails, a first quantity of failures of the random access request; and
   determining a first target uplink frequency range in the at least one second uplink frequency range in the paired combination of the frequency bands when the first quantity of failures reaches a preset threshold value, and sending, on a second uplink carrier in the first target uplink frequency range, the random access request to the network device.

2. The method according to claim 1, wherein the obtaining a first quantity of failures of the random access request comprises:
   adding a count value of a first counter corresponding to the first uplink carrier by one, obtaining the count value of the first counter to obtain the first quantity of failures, wherein the count value of the first counter is added by one when the random access request on the first uplink carrier fails, and is cleared when the random access request is successfully sent.

3. The method according to claim 2, wherein after the random access request is sent, on the second uplink carrier supported by the terminal, to the network device, the method further comprises:
   continuing to determine whether the random access request on the second uplink carrier is successful; obtaining, when the random access request on the second uplink carrier fails, a second quantity of failures of the random access request; determining, when the second quantity of failures reaches the preset threshold value, whether a new uplink frequency range exists in the second uplink frequency range in the paired combination of the frequency bands; and
   determining a second target uplink frequency range in the new uplink frequency range when the new uplink frequency range is determined to exist, and sending, on an uplink carrier within the second target uplink frequency range, the random access request to the network device.

4. The method according to claim 1, wherein the determining a first target uplink frequency range in the second uplink frequency range in the paired combination of the frequency bands comprises:
   determining a third uplink frequency range in the second uplink frequency range in the paired combination of the frequency bands, wherein the third uplink frequency range is a frequency range in the second uplink frequency range in which a carrier is less than the first uplink carrier; and
   determining an uplink frequency range that corresponds to a carrier having a smallest load in the third uplink frequency range, and determining the uplink frequency range that corresponds to the carrier having the smallest load as the first target uplink frequency range, or, randomly determining an uplink frequency range corresponding to a carrier in the third uplink frequency range as the first target uplink frequency range.

5. The method according to claim 4, wherein after the random access request is sent, on the second uplink carrier supported by the terminal, to the network device, the method further comprises:
   continuing to determine whether the random access request on the second uplink carrier is successful; obtaining, when the random access request on the second uplink carrier fails, a second quantity of failures of the random access request; determining, when the second quantity of failures reaches the preset threshold value, whether a new uplink frequency range exists in the second uplink frequency range in the paired combination of the frequency bands; and
   determining a second target uplink frequency range in the new uplink frequency range when the new uplink frequency range is determined to exist, and sending, on an uplink carrier within the second target uplink frequency range, the random access request to the network device.

6. The method according to claim 1, wherein after the random access request is sent, on the second uplink carrier supported by the terminal, to the network device, the method further comprises:
  continuing to determine whether the random access request on the second uplink carrier is successful; obtaining, when the random access request on the second uplink carrier fails, a second quantity of failures of the random access request; determining, when the second quantity of failures reaches the preset threshold value, whether a new uplink frequency range exists in the second uplink frequency range in the paired combination of the frequency bands; and
  determining a second target uplink frequency range in the new uplink frequency range when the new uplink frequency range is determined to exist, and sending, on an uplink carrier within the second target uplink frequency range, the random access request to the network device.

7. The method according to claim 6, wherein the method further comprises:
  determining that a wireless link connection fails when the new uplink frequency range is determined not to exist.

8. The method according to claim 6, wherein the method further comprises:
  sending uplink data on the second uplink carrier when the random access request on the second uplink carrier is successful.

9. A non-transitory computer-readable storage medium, comprising one or more programs, wherein the one or more programs are configured to perform a method for reestablishing a connection applied to a terminal;
  wherein the method comprises:
  sending by the terminal, on a first uplink carrier, a random access request to a network device when the terminal is out of uplink synchronization on the first uplink carrier in a first uplink frequency range supported by the terminal, wherein the first uplink carrier is a carrier that is determined by the network device in the first uplink frequency range in a paired combination of frequency bands supported by both the terminal and the network device, and the paired combination of the frequency bands consists of a first frequency band that comprises the first uplink frequency range and a first downlink frequency range and a supplementary uplink frequency band that comprises at least one second uplink frequency range, the first uplink frequency range being different from the at least one second uplink frequency range;
  obtaining, when the random access request on the first uplink carrier fails, a first quantity of failures of the random access request; and
  determining a first target uplink frequency range in the at least one second uplink frequency range in the paired combination of the frequency bands when the first quantity of failures reaches a preset threshold value, and sending, on a second uplink carrier in the first target uplink frequency range, the random access request to the network device.

10. The non-transitory computer-readable storage medium according to claim 9, wherein the obtaining a first quantity of failures of the random access request comprises:
  adding a count value of a first counter corresponding to the first uplink carrier by one, obtaining the count value of the first counter to obtain the first quantity of failures, wherein the count value of the first counter is added by one when the random access request on the first uplink carrier fails, and is cleared when the random access request is successfully sent.

11. The non-transitory computer-readable storage medium according to claim 9, wherein the determining a first target uplink frequency range in the second uplink frequency range in the paired combination of the frequency bands comprises:
  determining a third uplink frequency range in the second uplink frequency range in the paired combination of the frequency bands, wherein the third uplink frequency range is a frequency range in the second uplink frequency range in which a carrier is less than the first uplink carrier; and
  determining an uplink frequency range that corresponds to a carrier having a smallest load in the third uplink frequency range, and determining the uplink frequency range that corresponds to the carrier having the smallest load as the first target uplink frequency range, or, randomly determining an uplink frequency range corresponding to a carrier in the third uplink frequency range as the first target uplink frequency range.

12. The non-transitory computer-readable storage medium according to claim 9, wherein after the random access request is sent, on the second uplink carrier supported by the terminal, to the network device, the method further comprises:
  continuing to determine whether the random access request on the second uplink carrier is successful; obtaining, when the random access request on the second uplink carrier fails, a second quantity of failures of the random access request; determining, when the second quantity of failures reaches the preset threshold value, whether a new uplink frequency range exists in the second uplink frequency range in the paired combination of the frequency bands; and
  determining a second target uplink frequency range in the new uplink frequency range when the new uplink frequency range is determined to exist, and sending, on an uplink carrier within the second target uplink frequency range, the random access request to the network device.

13. The non-transitory computer-readable storage medium according to claim 12, wherein the method further comprises:
  determining that a wireless link connection fails when the new uplink frequency range is determined not to exist.

14. The non-transitory computer-readable storage medium according to claim 12, wherein the method further comprises:
  sending uplink data on the second uplink carrier when the random access request on the second uplink carrier is successful.

15. A terminal, comprising:
  a non-transitory computer-readable storage medium and one or more processors;
  wherein the non-transitory computer-readable storage medium comprises one or more programs, and the one or more processors are configured to execute the one or more programs in the non-transitory computer-readable storage medium;
  wherein the one or more programs are configured to perform a method for reestablishing a connection applied to a terminal;
  wherein the method comprises:
  sending by the terminal, on a first uplink carrier, a random access request to a network device when the terminal is out of uplink synchronization on the first uplink carrier in a first uplink frequency range supported by the terminal, wherein the first uplink carrier is a carrier that is determined by the network device in the first uplink frequency range in a paired combination of frequency bands supported by both the terminal and the network device, and the paired combination of the frequency bands consists of a first frequency band that comprises the first uplink frequency range and a first downlink frequency range and a supplementary uplink frequency band that comprises at least one second uplink frequency range, the first uplink frequency range being different from the at least one second uplink frequency range;

obtaining, when the random access request on the first uplink carrier fails, a first quantity of failures of the random access request; and determining a first target uplink frequency range in the at least one second uplink frequency range in the paired combination of the frequency bands when the first quantity of failures reaches a preset threshold value, and sending, on a second uplink carrier in the first target uplink frequency range, the random access request to the network device.

16. The terminal according to claim 15, wherein the obtaining a first quantity of failures of the random access request comprises:

adding a count value of a first counter corresponding to the first uplink carrier by one, obtaining the count value of the first counter to obtain the first quantity of failures, wherein the count value of the first counter is added by one when the random access request on the first uplink carrier fails, and is cleared when the random access request is successfully sent.

17. The terminal according to claim 15, wherein the determining a first target uplink frequency range in the second uplink frequency range in the paired combination of the frequency bands comprises:

determining a third uplink frequency range in the second uplink frequency range in the paired combination of the frequency bands, wherein the third uplink frequency range is a frequency range in the second uplink frequency range in which a carrier is less than the first uplink carrier; and determining an uplink frequency range that corresponds to a carrier having a smallest load in the third uplink frequency range, and determining the uplink frequency range that corresponds to the carrier having the smallest load as the first target uplink frequency range, or, randomly determining an uplink frequency range corresponding to a carrier in the third uplink frequency range as the first target uplink frequency range.

18. The terminal according to claim 15, wherein after the random access request is sent, on the second uplink carrier supported by the terminal, to the network device, the method further comprises:

continuing to determine whether the random access request on the second uplink carrier is successful; obtaining, when the random access request on the second uplink carrier fails, a second quantity of failures of the random access request; determining, when the second quantity of failures reaches the preset threshold value, whether a new uplink frequency range exists in the second uplink frequency range in the paired combination of the frequency bands; and determining a second target uplink frequency range in the new uplink frequency range when the new uplink frequency range is determined to exist, and sending, on an uplink carrier within the second target uplink frequency range, the random access request to the network device.

19. The terminal according to claim 18, wherein the method further comprises:

determining that a wireless link connection fails when the new uplink frequency range is determined not to exist.

20. The terminal according to claim 18, wherein the method further comprises:

sending uplink data on the second uplink carrier when the random access request on the second uplink carrier is successful.

* * * * *